(12) United States Patent
Bartier et al.

(10) Patent No.: US 11,405,142 B2
(45) Date of Patent: Aug. 2, 2022

(54) USE OF DIFFERENT DATA RATES FOR POLLING IN A MULTI-RATE NETWORK

(71) Applicant: Itron Global SARL, Liberty Lake, WA (US)

(72) Inventors: Jerome Bartier, Edinburgh (GB); Yacine Khaled, Meudon (FR)

(73) Assignee: Itron Global SARL, Liberty Lake, WA (US)

( * ) Notice: Subject to any disclaimer, the term of this patent is extended or adjusted under 35 U.S.C. 154(b) by 66 days.

(21) Appl. No.: 16/909,354

(22) Filed: Jun. 23, 2020

(65) Prior Publication Data

US 2021/0399835 A1 Dec. 23, 2021

(51) Int. Cl.
| | |
|---|---|
| *H04L 1/16* | (2006.01) |
| *H04W 40/12* | (2009.01) |
| *H04W 74/06* | (2009.01) |
| *H04W 84/18* | (2009.01) |
| *H04L 1/18* | (2006.01) |

(52) U.S. Cl.
CPC .......... *H04L 1/1685* (2013.01); *H04L 1/1858* (2013.01); *H04W 40/12* (2013.01); *H04W 74/06* (2013.01); *H04W 84/18* (2013.01)

(58) Field of Classification Search
CPC .... H04L 1/1685; H04L 1/1858; H04W 84/18; H04W 40/12; H04W 74/06
See application file for complete search history.

(56) References Cited

U.S. PATENT DOCUMENTS

| | | | |
|---|---|---|---|
| 2004/0203834 A1* | 10/2004 | Mahany | H01Q 1/22 455/453 |
| 2009/0003356 A1 | 1/2009 | Vaswani et al. | |
| 2009/0092103 A1* | 4/2009 | Rao | H04L 1/0027 370/336 |
| 2009/0268621 A1* | 10/2009 | Hoshino | H04L 1/0021 370/252 |
| 2019/0191387 A1* | 6/2019 | Shakya | H04W 52/143 |
| 2020/0099972 A1* | 3/2020 | Gerosa | H04L 65/1069 |

FOREIGN PATENT DOCUMENTS

EP 1879319 A1 1/2008

OTHER PUBLICATIONS

Extended European Search Report dated Nov. 8, 2021 for European Patent Application No. 21181251.6, 8 pages.

* cited by examiner

*Primary Examiner* — Jianye Wu
(74) *Attorney, Agent, or Firm* — Lee & Hayes, P.C.

(57) ABSTRACT

A first node operates in a network. The first node sends a polling message to a second node over a link at a first data rate, receiving an acknowledgement message from the second node. Based at least in part on receiving the acknowledgement message, the first node determines the second node is available to receive an information message. Based at least in part on the determining the second node is available to receive the information message, the first node sends the information message to the second node over the link at a second data rate. The second data rate is based at least on an indication of observed behavior of the link and the first data rate is based at least on the second data rate. For example, the first node may determine the first data rate to be a next slowest available data rate than the second data rate.

17 Claims, 5 Drawing Sheets

USE OF DIFFERENT DATA RATES FOR POLLING IN A MULTI-RATE NETWORK

BACKGROUND

Communication networks, such as wireless mesh networks, star networks, and so on, are used to connect a variety of different devices. These communication networks often contain devices that can communicate at multiple data rates. A device may select a data rate for communication based at least in part on metrics associated with data rates that are available. The metrics may indicate a success of previous communications at those data rates. However, when a particular data rate is determined to be preferred, other data rates may not be exercised and evaluated very well or at all.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
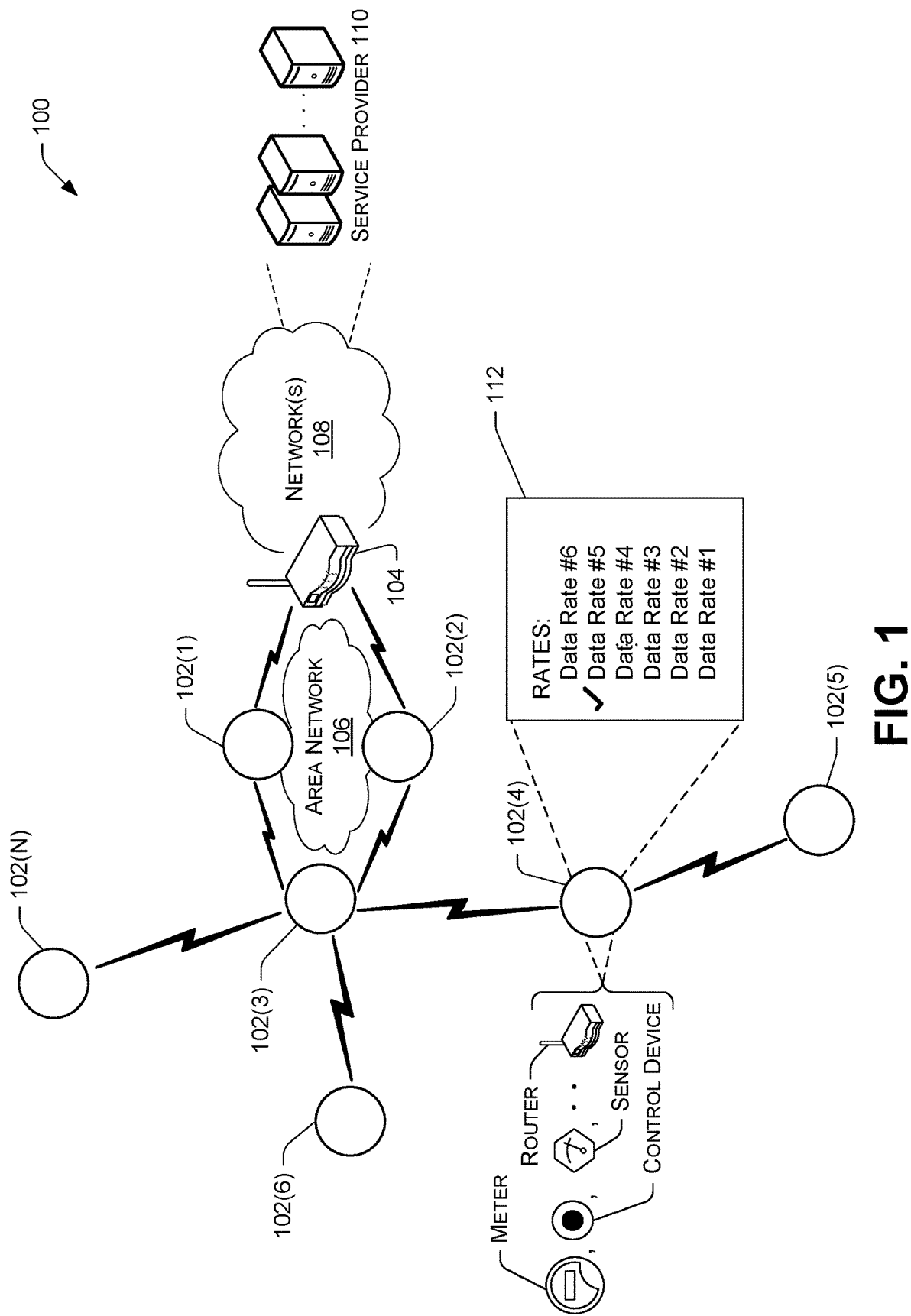
FIG. 1 is a schematic diagram of an example network architecture.

As discussed above, metrics associated with different data rates may be evaluated to select an appropriate data rate for a communication over a link between two nodes in a network. However, in many instances, relatively little information may be available about prior communications using some of the data rates. For example, some of the data rates may not have been used frequently. This may lead to an inappropriate evaluation of communication that would result from using the data rates.

This disclosure describes techniques directed to exercising one or more different data rates, even those data rates that have not been determined to be preferred based at least in part on metrics associated with communication using the data rates. Using one or more non-preferred data rates may allow for development of metrics associated with the one or more non-preferred data rates. As such, the techniques may result in link quality metric data associated with a data rate that may not otherwise be used frequently. This may ultimately lead to a more robust determination of which data rate is to be preferred.

In one illustration, at the data link layer (DLL) of the nodes, a first node in a network communicates with a direct neighbor node by first sending a polling message to the direct neighbor node. If the first node receives a polling acknowledgement message from the direct neighbor node corresponding to the polling message, the direct neighbor node is available for communication with the first node. The first node also sends an information message to the direct neighbor node. If the first node receives an information acknowledgement message from the direct neighbor node, the direct neighbor node successfully received the information message. This exchange may be called a PADA exchange (POLL-ACK-DATA-ACK).

The term INFO refers to the information message sent in the PADA exchange. Each node can compute link quality metric data, such as an INFO success percentage (INFO %) to each of its direct neighbor nodes. For example, a node may use an exponentially weighted moving average formula. A node can make this computation whenever it sends an information message, based at least in part on whether the node receives an information acknowledgement message after sending an information message. In some examples, the node computes a separate INFO % or other link quality metric data for each data rate the node uses to send communications over the link.

In some examples, the node may use only the information messages to determine link quality metric data. The success (or not) of information message may favorably represent the link quality between directly connected nodes. For example, the node does not necessarily know the direct neighbor node is listening for polling messages, but the node knows that the direct neighbor node is listening for information messages (as a result of having received an acknowledgement message corresponding to a polling message).

In some examples, however, the node may use both the information messages and the polling messages to determine link quality metric data. By using the polling messages as well as the information messages to determine link quality metric data, the node may more robustly determine the link quality metric data. For example, for sending information messages, the node may utilize one data rate and determine link quality metric data associated with communication using that one data rate. And, for sending polling messages, the node may utilize another data rate and determine link quality metric data associated with communication using that other data rate. By utilizing one data rate for information messages and another data rate for polling messages, and separately determining link quality metrics for each data rate, more link quality metrics can be developed from a single PADA exchange. Having more link quality metrics for different data rates, the node may be better able to robustly select a preferred data rate for information messages.

For example, the other data rate, used for polling messages, may be lower than the preferred data rate, used for information messages. The other data rate, utilized for polling messages, may be the data rate that is next slowest from the preferred data rate, utilized for information messages. In these examples, it may be particularly useful to develop link quality metrics for the next slowest data rate from the preferred data rate. For example, in situations in which the information messages begin to degrade, there may be a suitable amount of information from which the node can determine if the next slowest data rate may be appropriate to become the preferred data rate for information messages. If the node decreases to a slower data rate about which the node has little information, because the slower data rate has not been exercised much or at all, this could potentially exacerbate the communication issues. For example, if the link performs poorly even at the slower data rate, subsequent communication over the link will not be improved by using the slower data rate. But the subsequent communication over the link using the slower data rate will increase on-air time for the link, which can exacerbate whatever issues the link is already experiencing, such as saturation of the link.

In some examples, the techniques may be implemented in the context of an advanced metering infrastructure (AMI) of a utility communication network. However, the techniques described herein are not limited to use in a utility industry AMI. For example, the techniques may be implemented in the context of Distribution Automation, Home Energy Management or any other type of wireless or wired network. Unless specifically described to the contrary, the techniques described herein are applicable to any communications network, control network, and/or another type of network or system. In one example, the techniques may be implemented in the context of the Internet of Things (IoT).

Example Environment

FIG. 1 is a diagram illustrating an example networked environment or architecture 100. The architecture 100 includes multiple network communication devices 102(1)-102(N) (collectively referred to as "network communication devices 102") and a network communication device 104, where N is any integer greater than or equal to 1. The network communication devices 102 and the network communication device 104 may be in communication with one another via an area network (AN) 106. In the example of FIG. 1, the network communication device 104 is implemented as an edge device, which serves as a connection point of the AN 106 to one or more networks 108 (e.g., a backhaul network), such as the Internet. The network communication device 104 may include, but is not limited to, a field area router (FAR), a cellular relay, a cellular router, an edge router, a DODAG (Destination Oriented Directed Acyclic Graph) root, a root device or node of the AN 106, a combination of the foregoing, or the like. In this example, the network communication device 104 relays communications from the AN 106 to a service provider 110 via the one or more networks 108.

As used herein, the term "area network" (AN) refers to a defined group of devices that are in communication with one another via one or more wired or wireless links. Examples of area networks include, for example, local area networks (LANs), neighborhood area networks (NANs), personal area networks (PANs), home area networks (HANs), field area networks (FANs), or the like. While only one AN 106 is shown in FIG. 1, in practice, multiple ANs may exist and may collectively define a larger network, such as an advanced metering infrastructure (AMI) of a utility communication network. At any given time, each individual device may be a member of a particular AN. Over time, however, devices may migrate from one AN to another geographically proximate or overlapping AN based on a variety of factors, such as respective loads on the ANs, battery reserves, interference, or the like.

The term "link" refers to a direct communication path between two devices (without passing through or being relayed by another device). A link may be over a wired or wireless communication path. Each link may represent a plurality of channels over which a device is able to transmit or receive data. Each of the plurality of channels may be defined by a frequency range which is the same or different for each of the plurality of channels. In some instances, the plurality of channels comprises Radio Frequency (RF) channels. The AN 106 may implement a channel hopping sequence, such that a channel may change over time. Although many examples discussed herein implement a plurality of channels as data channels, in some instances the plurality of channels include a control channel that is designated for communicating messages to specify a data channel to be utilized to transfer data. Transmissions on the control channel may be shorter relative to transmissions on the data channels.

The AN 106 may comprise a mesh network, in which the network communication devices relay data through the AN 106. Alternatively, or additionally, the AN 106 may comprise a star network, in which a central device acts as a parent to one or more children devices. Further, in some instances the AN 106 may include a portion that is implemented as a mesh network and a portion that is implemented as a star network. Moreover, in other instances the AN 106 may be implemented in whole or part by other types of networks, such as hub-and-spoke networks, mobile networks, cellular networks, etc. In some instances, a device may be able to communicate with multiple different types of networks (e.g., a mesh network and a star network) at the same or different times. For instance, if a device is unable to discover a suitable device in a mesh network mode, the device may attempt to connect to a nearby star network, mobile data collection network, or cellular network. Regardless of the topology of the AN 106, individual network communication devices may communicate by wireless (e.g., radio frequency) and/or wired (e.g., power line communication, Ethernet, serial, etc.) connections.

In some instances, the service provider 110 comprises one or more central office systems that include a security service such as Authentication, Authorization and Accounting (AAA) server, a network registration service such as Dynamic Host Configuration Protocol (DHCP) server, a network management service (NMS), a collection engine (CE), a meter data management system (in the utility context), a customer relationship management system (in the sales context), a diagnostic system (in a manufacturing context), an inventory system (in a warehouse context), a patient record system (in the healthcare context), a billing system, etc. Network communication devices may register or interact with some or all of these one or more central office systems. In one example, the one or more central office systems may implement a meter data management system to collect resource consumption data from the network communication devices of the AN 106, process the resource consumption data, provide data regarding resource consumption to customers, utilities, and others, and/or perform a variety of other functionality. In other instances, the service provider 110 comprises other systems to implement other functionality, such as web services, cloud services, and so on. In yet other instances, the service provider 110 may be implemented as other types of devices, such as in the context of the Internet of Things (IoT) that allows a variety of devices to exchange data.

The service provider 110 may be physically located in a single central location, or it may be distributed at multiple different locations. The service provider 110 may be hosted privately by an entity administering all or part of the communications network (e.g., a utility company, a governmental body, distributor, a retailer, manufacturer, etc.), or may be hosted in a cloud environment, or a combination of privately hosted and cloud hosted services.

As noted above, any of the network communication devices 102, the network communication device 104, and/or the service provider 110 may communicate with various data rates and perform processing to determine and indicate a preferred data rate. In the FIG. 1 illustration, Data Rate #5 is indicated by a check mark in the data structure 112 as being a preferred data rate. As also noted above, even though one data rate is indicated as being preferred, a network communication device 102 may be configured to sometimes communicate using at least one other, non-preferred, data rate, such as by sending polling messages at a next lower data rate than the preferred data rate.

ETX metric equals 1/P, where P=Pf×Pr. Here, Pf corresponds to a probability that a transmission successfully arrives at a recipient, and Pr corresponds to a probability that an acknowledgment transmission is successfully received by a sender. Pf and Pr may be calculated according to the following formulas:

$$Pf = \frac{\text{Number of transmissions (e.g., probes) received by a neighbor (e.g., recipient)}}{\text{Number of transmissions (e.g., probes) sent by a sender}}$$

$$Pr = \frac{\text{Number of transmissions (e.g., probes) received by a sender}}{\text{Number of transmissions (e.g., probes) sent by a neighbor (e.g., recipient)}}$$

For instance, the network communication device 102(4) may transmit and/or receive one or more information messages/transmissions (e.g., Protocol Data Units (PDUs), such as bits, frames, packets, segments, etc.) to and/or from the network communication device 102(5) using the preferred data rate, and transmit and/or receive one or more polling messages/transmissions using at least one second, non-preferred, data rate. If, for example, the preferred data rate is Data Rate #5, the network communication device 102(4) may transmit and/or receive one or more information messages/transmissions with the network communication device 102(5) using Data Rate #5 and transmit and/or receive one or more polling messages/transmissions with the network communication device 102(5) using Data Rate #4. If, for example, information message using the preferred data rate degrades, the second data rate may become the preferred data rate, based at least in part on link quality metrics developed during the communication of polling messages. For example, the six data rates may be as follows:

Data Rate 1: 50 kilobits per second (kbs);
Data Rate 2: 100 kbs;
Data rate 3: 200 kbps;
Data Rate 4: 300 kbps;
Data Rate 5: 400 kbps;
Data Rate 6: 500 kbps.

Communication metric data may include a detected/measured value, a computed value, or any other statistic, metric, or value related to communication. For example, communication metric data may indicate a number of transmission attempts (e.g., a number of transmissions sent), a number of successful transmissions (e.g., a number of transmissions that are acknowledged by a receiving node), a number of unsuccessful transmissions (e.g., calculated by subtracting a number of transmission attempts by a number of acknowledgements), and so on. Further, in some examples, communication metric data includes an Expected Transmission (ETX) metric and/or an Expected Transmission Time (ETT) metric, as discussed in further detail below.

In many instances, communication metric data may include data that is specific to a particular data rate and/or to a particular link (e.g., direct communication path between devices). To illustrate, communication metric data may indicate a number of successful transmissions and a number of transmission attempts via a particular link (between a first node and a second node) with a particular data rate.

An ETX metric may generally indicate an expected number of transmissions required to successfully send a transmission to a device. The ETX metric may be computed in a variety of manners. In one example, an ETX metric equals a total number of transmissions sent (e.g., transmission attempts) over a number of successful transmissions (e.g., transmissions acknowledged). In another example, an In some instances, such as where Pf and Pr cannot be computed separately (e.g., when the sender does not know the number of transmissions that a receiver sent to it), then the ETX metric may be estimated as in the first example above. That is, if Pf and Pr cannot be computed separately due to a lack of information, the ETX metric may correspond to a total number of transmissions sent over a number of successful transmissions.

An ETT metric may generally indicate an expected time required to successfully send a transmission to a device. In one example, the ETT metric equals a time to transmit a transmission of a given size multiplied by the ETX metric.

Communication metric data may be used in a variety of manners. In some instances, communication metric data is used to select a data rate for communicating. For example, a network communication device may select a data rate to use for communicating on a particular link based at least in part on ETX metrics for multiple data rates that are available for the link. In particular, if a first data rate that is supported by two network communication devices is associated with a lower ETX metric than a second data rate that is also supported by the two network communication devices, the first data rate may be selected.

Example Network Communication Device

Figure 2:
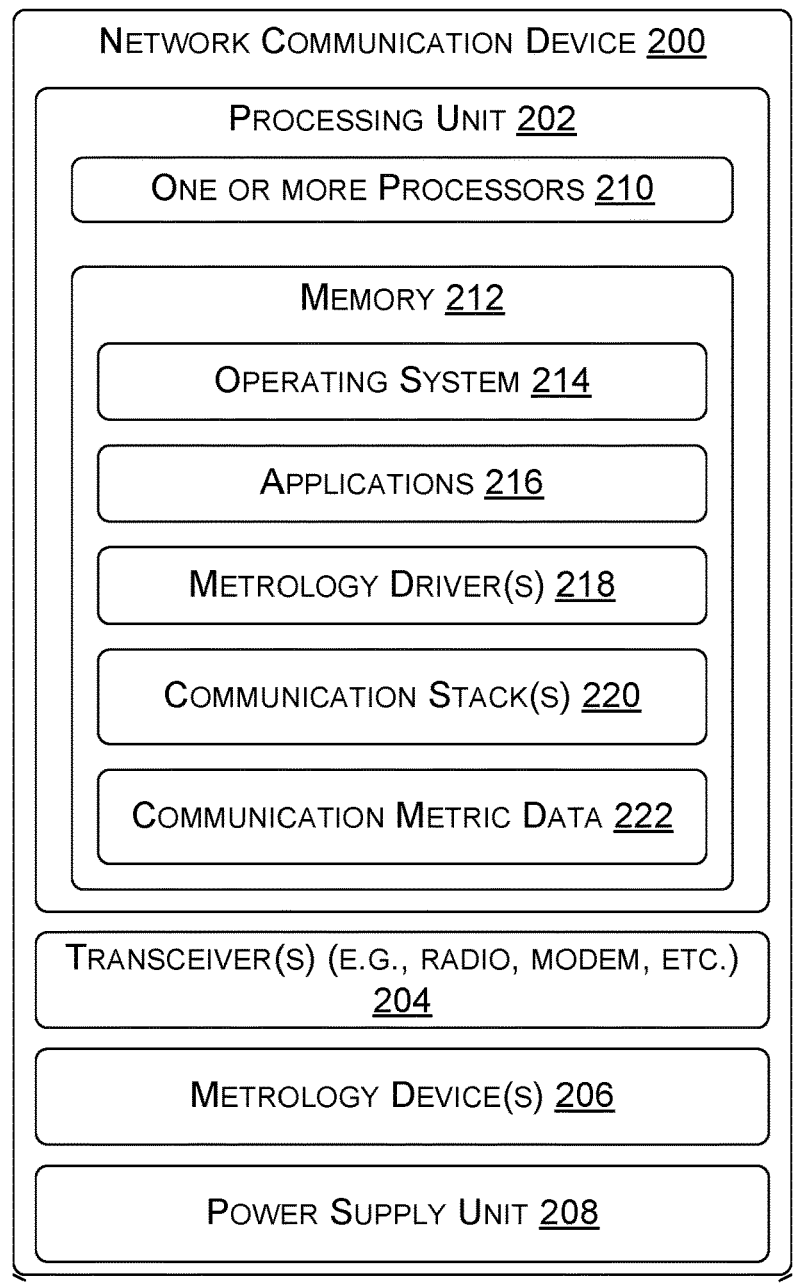
FIG. 2 is a diagram showing details of an example network communication device.
Figure 2:
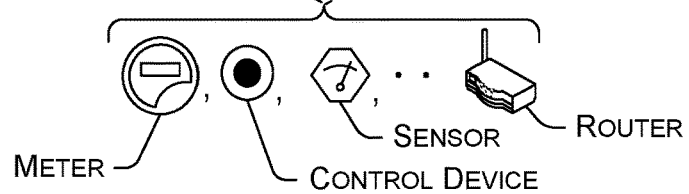

FIG. 2 is a diagram showing details of an example network communication device 200, such as any of the network communication devices 102 or the network communication device 104. The network communication device 200 may comprise any type of network communication device (sometimes referred to as a node, computing device, or just device), such as a router (e.g., a field area router (FAR), a cellular router, an edge router, etc.), a utility meter (e.g., electricity, water, or gas meter), a relay (e.g., a cellular relay), a repeater, a transformer, a sensor, a switch, a control device, an encoder/receiver/transmitters (ERTs), an appliance, a personal computer (e.g., a desktop computer, a laptop computer, etc.), a mobile device (e.g., a smartphone, a tablet, a personal digital assistant (PDA), an electronic reader device, etc.), a wearable computer (e.g., a smart watch, an optical head-mounted display (OHMD), etc.), a server, an access point, a portable navigation device, a portable gaming device, a portable media player, a television, a set-top box, computer system(s) in an automobile (e.g., navigation system), a camera, a robot, a hologram system, a security system, a home-based computer system (e.g., an intercom system, a home media system, etc.), a projector, an automated teller machine (ATM), and so on.

In some instances, the network communication device 200 comprises a Full Function Device (FFD), while in other instances the network communication device 200 comprises a Limited Function Device (LFD). An FFD may include more functionality/resources than an LFD, such as different processing powers, processing capabilities, power reliance, hardware components, etc. In one example, an FFD is implemented as a Mains Powered Device (MPD) that is connected to mains electricity (e.g., electricity meters), while an LFD is implemented as a Battery Powered Device (BPD) that is not connected to mains electricity (e.g., a water meter, gas meter, etc. that employs batteries). Since an MPD relies on mains power, the MPD may remain in an active state (e.g., a state associated with consuming more than a threshold amount of power). Meanwhile, since a BPD relies on battery power, the BPD may enter a sleep state (e.g., a state associated with consuming less than a threshold amount of power) when the BPD is not communicating or otherwise performing operations. The BPD may use a communication schedule to determine when to enter a sleep state and/or when to enter an active state. This may allow the BPD to conserve battery life. In some instances, components of LFDs are lower power components than the corresponding components of the FFDs.

As shown in FIG. 2, the example network communication device 200 includes a processing unit 202, a transceiver(s) 204 (e.g., radio, modem, etc.), one or more metrology devices 206, and a power supply unit 208. The processing unit 202 may include one or more processors 210 and memory 212. The one or more processors 210 may comprise microprocessors, central processing units, graphics processing units, or other processors usable to execute program instructions to implement the functionality described herein. Additionally, or alternatively, in some examples, some or all of the functions described may be performed in hardware, such as an application specific integrated circuit (ASIC), a gate array, or other hardware-based logic device.

The transceiver(s) 204 may comprise one or more hardware and/or software implemented radios to provide two-way RF communication with other network communication devices in the AN 106 and/or other devices via the network 108. The transceiver(s) 204 may additionally or alternatively include a modem to provide power line communication (PLC) communication with other network communication devices that are connected to an electrical service grid.

In some instances, the transceiver(s) 204 may include different characteristics depending on the type of device implementing the transceiver(s) 204. For example, while both FFDs and LFDs have transceivers, the specific transceivers used may be different. To illustrate, an FFD transceiver may include a PLC modem while an LFD transceiver may not because the LFD is not connected to an electrical power line that could be used for PLC communications. Additionally, or alternatively, an LFD transceiver may employ a lower power RF radio to minimize energy consumption.

The metrology device(s) 206 may comprise physical hardware and/or sensors to measure consumption data of a resource (e.g., electricity, water, or gas) at a site of the meter. In the case of an electric meter, for example, the metrology device(s) 206 may include one or more Hall effect sensors, shunts, or the like. In the case of water and gas meters, the metrology device(s) 206 may comprise various flow meters, pressure sensors, or the like. The metrology device(s) 206 may report the consumption data to a service provider via the transceiver(s) 204. The consumption data may be formatted and/or packetized in a manner or protocol for transmission.

The power supply unit 208 may provide power to the network communication device 200. In some instances, such as when the network communication device 200 is implemented as an FFD, the power supply unit 208 comprises a mains power connector that couples to an Alternating Current (AC) or Direct Current (DC) mains power line where the network communication device 200 is installed. In other instances, such as when the network communication device 200 is implemented as an LFD, the power supply unit 208 comprises a battery, such as a Lithium Thionyl Chloride battery (e.g., a 3 volt battery having an internal impedance rated at 130 Ohms), a Lithium Manganese battery (e.g., a 3 volt battery having an internal impedance rated at 15 Ohms), a Lithium Ion battery, a lead-acid battery, an alkaline battery, and so on.

The memory 212 includes an operating system (OS) 214 and one or more applications 216 that are executable by the one or more processors 210. The memory 212 may also include one or more metrology drivers 218 configured to receive, interpret, and/or otherwise process metrology data collected by the metrology device(s) 206. Additionally, or alternatively, one or more of the applications 216 may be configured to receive and/or act on data collected by the metrology device(s) 206.

The memory 212 may also include one or more communication stacks 220. In some examples, the communication stack(s) 220 may be configured to implement a 6LowPAN protocol, an 802.15.4e (TDMA CSM/CA) protocol, an 802.15.4-2015 protocol, 802.15.4 g protocol, and/or another protocol. However, in other examples, other protocols may be used, depending on the networks with which the device is intended to be compatible. The communication stack(s) 220 describe the functionality and rules governing how the network communication device 200 interacts with each of the specified types of networks. For instance, the communication stack(s) 220 may cause FFDs and LFDs to operate in ways that minimize the battery consumption of LFDs when they are connected to these types of networks.

As illustrated, the memory 212 may also store communication metric data 222. Communication metric data 222 may be updated from time to time to maintain data for multiple data rates and/or multiple communication links.

In some instances, the network communication device 200 may be configured to send or receive communications on multiple channels simultaneously. For example, the transceiver(s) 204 may be configured to receive data at the same time on hundreds of channels. Additionally, or alternatively, the transceiver(s) 204 may be configured to send data at the same time on hundreds of channels.

The memory 212 of the network communication device 200 may include software functionality configured as one or more "modules." The modules are intended to represent example divisions of software for purposes of discussion, and they are not intended to represent any type of requirement or required method, manner or necessary organization. Accordingly, while various "modules" are discussed, their functionality and/or similar functionality could be arranged differently (e.g., combined into a fewer number of modules, broken into a larger number of modules, etc.).

The various memories described herein (e.g., the memory 212) are examples of computer-readable media. Computer-readable media may take the form of volatile memory, such as random access memory (RAM) and/or non-volatile memory, such as read only memory (ROM) or flash RAM. Computer-readable media devices include volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device. As defined herein, computer-readable media does not include transitory media, such as modulated data signals and carrier waves, and/or signals.

While detailed examples of certain network communication devices are described herein, it should be understood that those network communication devices may include other components and/or be arranged differently. As noted above, in some instances a network communication device may include one or more processors and memory storing processor executable instructions to implement the functionalities they are described as performing. Certain network communication devices may additionally or alternatively include one or more hardware components (e.g., application specific integrated circuits, field programmable gate arrays, systems on a chip, and the like) to implement some or all of the functionalities they are described as performing. Further, certain network communication devices may include one or more network interfaces to send or receive data.

Example Processes

Figure 3:
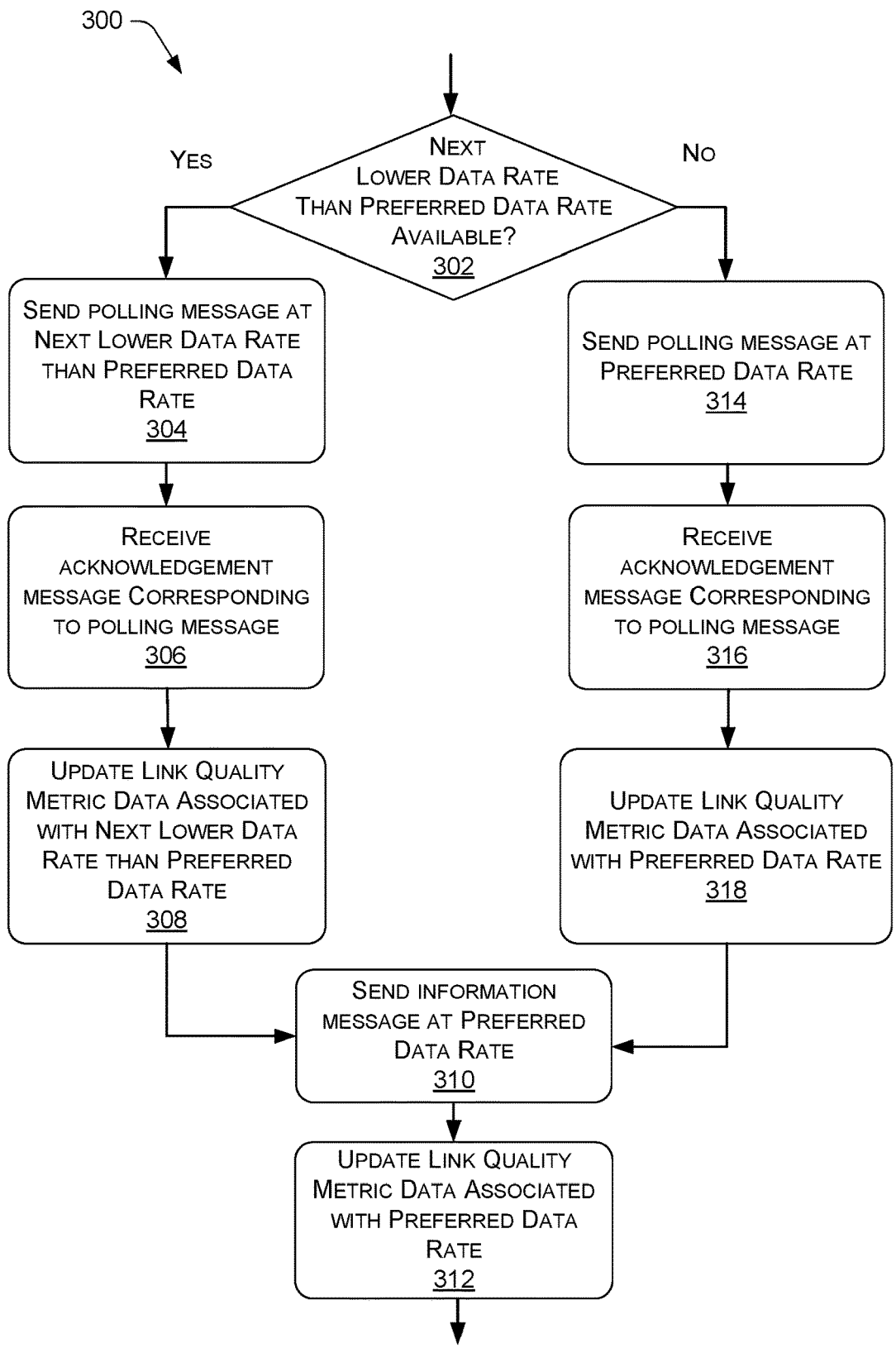
FIG. 3 illustrates an example process for a node to communicate with another node using a polling/communication approach and in a manner in which link quality metric data associated with at least two different data rates may be updated.
Figure 4:
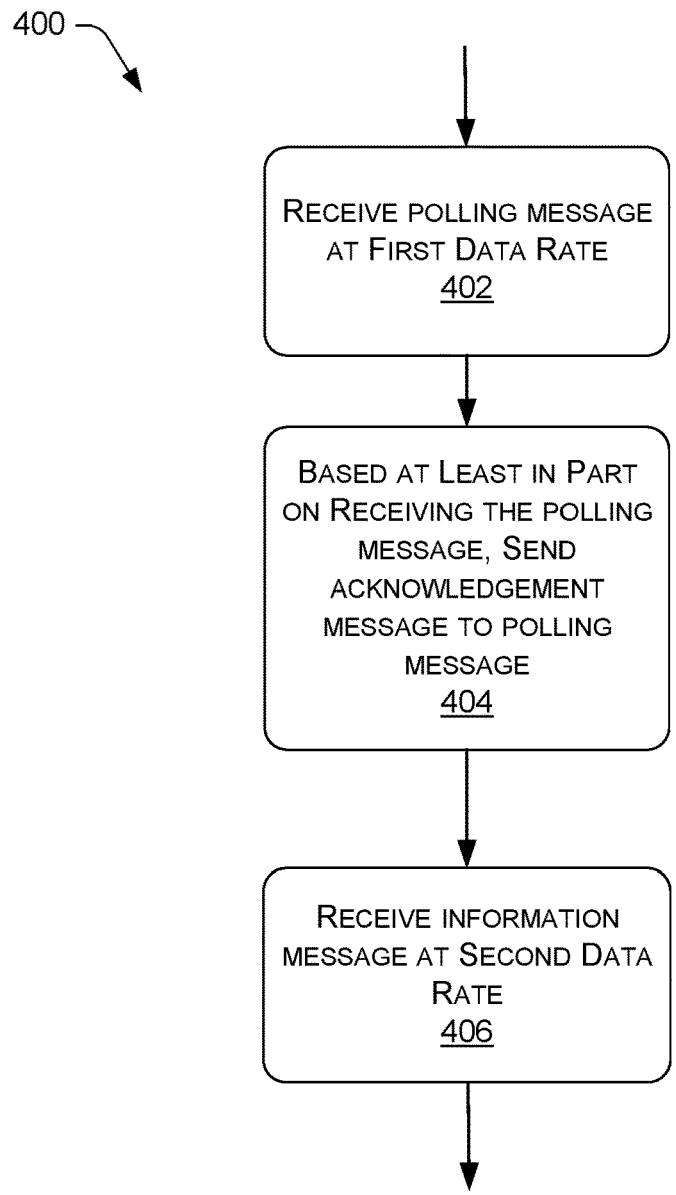
FIG. 4 illustrates an example process for a node that receives polling and information messages from another node.
Figure 5:
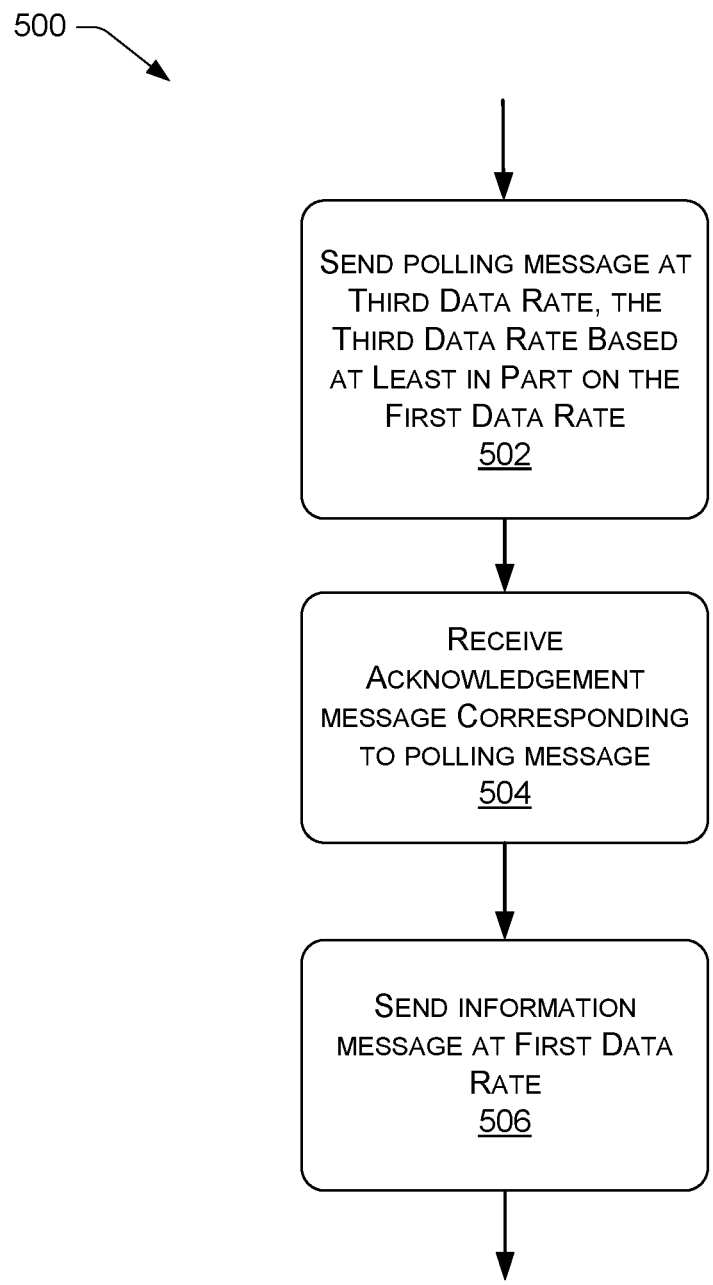
FIG. 5 illustrates another example process for a node to communicate with another node using a polling/communication approach and in a manner in which link quality metric data associated with at least two different data rates may be updated.

FIGS. 3, 4 and 5 illustrate example processes 300, 400 and 500 for employing the techniques discussed herein. For ease of illustration, the processes 300, 400 and 500 may be described as being performed by a device described herein, such as the network communication device 200 and/or the service provider 110. However, the processes 300, 400 and 500 may be performed by other devices. Moreover, the devices may be used to perform other processes.

The processes 300, 400 and 500 (as well as each process described herein) are illustrated as logical flow graphs, each operation of which represents a sequence of operations that can be implemented in hardware, software, or a combination thereof. In the context of software, the operations represent computer-readable instructions stored on one or more computer-readable storage media that, when executed by one or more processors, perform the recited operations. Generally, computer-readable instructions include routines, programs, objects, components, data structures, and the like that perform particular functions or implement particular abstract data types. In some contexts of hardware, the operations may be implemented (e.g., performed) in whole or in part by hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The order in which the operations are described is not intended to be construed as a limitation, and any number of the described operations can be combined in any order and/or in parallel to implement the process. Further, any number of the described operations may be omitted.

FIG. 3 illustrates an example process 300 for a node to communicate with another node using a polling/communication approach and in a manner in which link quality metric data associated with at least two different data rates may be separately updated. For example, the node may be the network communication device 102(4) and the other node may be the network communication device 102(3). The operations of the process 300 may be performed by one or more processors of a node by executing instructions stored in a memory of the node.

At 302, the node determines if there is a next lower data rate available than the preferred data rate. In other examples, the determination is not limited to a next lower data rate or even to any lower data rate. If there is a next lower data rate available (or, in the other examples, a lower data rate or any other data rate), at 304, the node sends a polling message to the other node at the other available data rate, such as the next lower data rate than the preferred data rate. For example, the network communication device 102(4) may send the polling message to the network communication device 102(3). Furthermore, for example, the data rate indicated to be the preferred data rate may be indicated based at least in part on observed behavior of the link, such as link quality metric data associated with the link, such as associated with communication over the link at various data rates.

At 306, the node receives an acknowledgement message, from the other node, corresponding to the polling message the node sends at 304. For example, the network communication device 102(4) may receive an acknowledgement message from the network communication device 102(3). At 308, the node updates link quality metric data for the link associated with communication over the link at the other available data rate, such as at the next lower data rate than the preferred data rate.

At 310, the node sends an information message to the other node at the preferred data rate. At 312, the node updates link quality metric data associated with the communication over the link at the preferred data rate. As a result of carrying out the operations 308 and 312, the node updates link quality metric data for communication over the link at two different data rates, with a single polling/information exchange.

Referring still to FIG. 3, it may be determined at 302 that a next lower data rate than the preferred data rate is not available. In this situation, at 314, the node sends a polling message to the other node at the preferred data rate. At 316, the node receives an acknowledgement message, from the other node, corresponding to the polling message the node sends at 314.

At 318, the node updates link quality metric data for the link associated with communication over the link at the preferred data rate. At 310, the node sends an information message to the other node at the preferred data rate. At 312, the node updates link quality metric data associated with the communication over the link at the preferred data rate. As a result of carrying out the operations 310 and 312, for the situation in which a next lower data rate than the preferred data rate is not available, the node updates link quality metric data for communication over the link at the preferred data rate.

FIG. 4 illustrates an example process 400 for a node that receives polling and information messages from another node. For example, the node may be the network communication device 102(3), receiving polling and information messages from the other network communication device 102(4). The operations of the process 400 may be performed by one or more processors of a node by executing instructions stored in a memory of the node.

At 402, the node receives a polling message at a first data rate. The polling message may be, for example, the polling message sent at 304 of the process 300, at a next lower data rate than a preferred data rate. At 404, based at least in part on receiving the polling message, the node sends an acknowledgement message corresponding to the polling message. The acknowledgement message may be, for example, the acknowledgement message received at 306 of the process 300. At 406, the node receives an information message at a second data rate. The information message may be, for example, the information message sent at 310 of the process 300, at the preferred data rate. As a result of carrying out the operations 402, 404 and 406, the other node may update link quality metric data for communication over the link at two different data rates, with a single polling/information exchange.

FIG. 5 illustrates an example process 500 for a node to communicate with another node using a polling/communication approach and in a manner in which link quality metric data associated with at least two different data rates may be updated. The example process 500 may be carried out by the node, for example, sometime after the process 300 in a situation in which the preferred data rate of the process 300 is no longer suitable to use for communication over the link. For example, in the process 500, the first data rate may be the next lower data rate than the no-longer-preferred data rate, at which the polling message is sent at 304 in the process 300. Furthermore, the node may be the network communication device 102(4) and the other node may be the network communication device 102(3). The operations of the process 500 may be performed by one or more processors of a node by executing instructions stored in a memory of the node.

Referring still to FIG. 5, at 502, the node sends a polling message at a third data rate. The third data rate is based at least in part on the first data rate. For example, the first data rate may be the newly-preferred data rate for which link quality metrics were updated based at least in part on the transmission of polling messages, such as in the operations 304, 306 and 308 of the process 300. The first data rate may have been more robustly selected as the newly-preferred data rate based at least in part on previous updating of the link quality metrics based on transmission of polling information over the link at the first data rate. The third data rate may be, for example, a next lower data rate than the first data rate. At 504, the node receives an acknowledgement message corresponding to the polling message sent at 502. At 506, the node sends an information message at the first data rate. While not shown in FIG. 5, the node may also update link quality metrics associated with communication over the link at the third data rate, based at least in part on the sending of the polling message at the third data rate. Furthermore, the node may also update link quality metrics associated with communication over the link at the first data rate, based at least in part on the sending of the information message at the first data rate.

This disclosure has thus described techniques directed to exercising one or more different data rates, even those that have not been determined to be preferred based at least in part on metrics associated with communication using the data rates. Using a non-preferred data rate may allow for development of link quality metrics associated with one or more non-preferred data rates. As such, the techniques may generate link quality communication metric data for a data rate that may not otherwise be used frequently or at all, which may ultimately lead to a more robust determination of which data rate may be preferred.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method of operating a first node in a network, comprising:
   sending a polling message to a second node over a link at a first data rate, the first data rate being a next available lower data rate than a preferred data rate;
   receiving a first acknowledgement message corresponding to the polling message from the second node;
   based at least in part on receiving the first acknowledgement message from the second node:
      updating first link quality metric data based on communication over the link at the first data rate, the first link quality metric data including at least one of:
         a first Expected Transmission (ETX) metric indicative of a first ratio of a number of transmission attempts sent by the first node to the second node to a number of acknowledged transmission attempts, at the first data rate, or
         a first Expected Transmission Time (ETT) metric indicative of a time to transmit a transmission of a given size multiplied by the first ETX metric at the first data rate, and
      determining the second node to be available to receive an information message;
   based at least in part on the determining the second node to be available to receive the information message, sending the information message to the second node over the link at a second data rate, the second data rate being the preferred data rate;
   receiving a second acknowledgement message corresponding to the information message from the second node;
   based at least in part on receiving the second acknowledgement message:
      determining that the second node has received the information message from the first node, and
      updating second link quality metric data based on communication over the link at the second data rate, the second link quality metric data including at least one of:
         a second ETX metric indicative of a second ratio of a number of transmission attempts sent by the first node to the second node to a number of acknowledged transmission attempts, at the second data rate, or
         a second ETT metric indicative of a time to transmit a transmission of a given size multiplied by the second ETX metric at the second data rate; and
   based at least in part on the first and second updated link quality metric data, setting the first data rate as a new preferred data rate.

2. The method of claim 1, wherein:
   the information message is a first information message, and
   the method further comprises:
      sending a second information message to the second node over the link at the first data rate.

3. The method of claim 2, wherein:
   the polling message is a first polling message, and
   the method further comprises:

sending a second polling message to the second node over the link at a third data rate, the third data rate based at least in part on the first data rate; and receiving an acknowledgement message corresponding to the second polling message, wherein sending the second information message is based at least in part on the receiving the acknowledgement message corresponding to the second polling message.

4. The method of claim 3, further comprising:

determining the third data rate to be a next slowest available data rate than the first data rate.

5. The method of claim 1, wherein based at least in part on the first and second updated link quality metric data, setting the first data rate as the new preferred data rate includes:

setting the first data rate as the new preferred data rate in response to determining, based at least in part on the second link quality metric data, that link quality using the second data rate has degraded.

6. The method of claim 5, wherein the first link quality metric data indicates that the first data rate is appropriate to be the new preferred data rate.

7. A node for operation in a network, comprising:

one or more processors;

memory coupled to the one or more processors, the memory storing instructions executable by the one or more processors to perform operations comprising:

sending a polling message to another node over a link at a first data rate, the first data rate being a next available lower data rate than a preferred data rate;

receiving a first acknowledgement message corresponding to the polling message from the other node;

based at least in part on receiving the first acknowledgement message from the other node:

updating first link quality metric data based on communication over the link at the first data rate, the first link quality metric data including at least one of:

a first Expected Transmission (ETX) metric indicative of a first ratio of a number of transmission attempts sent by the node to the other node to a number of acknowledged transmission attempts, at the first data rate, or a first Expected Transmission Time (ETT) metric indicative of a time to transmit a transmission of a given size multiplied by the first ETX metric at the first data rate, and determining the other node to be available to receive an information message;

based at least in part on the determining the other node to be available to receive the information message, sending the information message to the other node over the link at a second data rate, the second data rate being the preferred data rate;

receiving a second acknowledgement message corresponding to the information message from the other node;

based at least in part on receiving the second acknowledgement message:

determining that the other node has received the information message from the node, and updating second link quality metric data based on communication over the link at the second data rate, the second link quality metric data including at least one of:

a second ETX metric indicative of a second ratio of a number of transmission attempts sent by the node to the other node to a number of acknowledged transmission attempts, at the second data rate, or a second ETT metric indicative of a time to transmit a transmission of a given size multiplied by the second ETX metric at the second data rate; and based at least in part on the first and second updated link quality metric data, setting the first data rate as a new preferred data rate.

8. The node of claim 7, wherein:

the information message is a first information message, and the operations further comprise:

sending a second information message to the other node over the link at the first data rate.

9. The node of claim 8, wherein:

the polling message is a first polling message, and the operations further comprise:

sending a second polling message to the other node over the link at a third data rate, the third data rate based at least in part on the first data rate; and receiving an acknowledgement message corresponding to the second polling message, wherein sending the second information message is based at least in part on the receiving the acknowledgement message corresponding to the second polling message.

10. The node of claim 9, wherein the operations further comprise:

determining the third data rate to be a next slowest available data rate than the first data rate.

11. The node of claim 7, wherein based at least in part on the first and second updated link quality metric data, setting the first data rate as the new preferred data rate includes:

setting the first data rate as the new preferred data rate in response to determining, based at least in part on the second updated link quality metric data, that link quality using the second data rate has degraded.

12. The node of claim 11, wherein the first updated link quality metric data indicates that the first data rate is appropriate to be the new preferred data rate.

13. One or more non-transitory computer-readable media storing thereon computer-readable instructions that, when executed by one or more processors of a first node, cause the one or more processors to perform operations comprising:

sending a polling message to a second node over a link at a first data rate, the first data rate being a next available lower data rate than a preferred data rate;

receiving a first acknowledgement message corresponding to the polling message from the second node;

based at least in part on receiving the first acknowledgement message from the second node:

updating first link quality metric data based on communication over the link at the first data rate, the first link quality metric data including at least one of:

a first Expected Transmission (ETX) metric indicative of a first ratio of a number of transmission attempts sent by the first node to the second node to a number of acknowledged transmission attempts, at the first data rate, or a first Expected Transmission Time (ETT) metric indicative of a time to transmit a transmission of a given size multiplied by the first ETX metric at the first data rate, and determining the second node to be available to receive an information message;

based at least in part on the determining the second node to be available to receive the information message, sending the information message to the second node over the link at a second data rate, the second data rate being the preferred data rate;

receiving a second acknowledgement message corresponding to the information message from the second node;

based at least in part on receiving the second acknowledgement message:

determining that the second node has received the information message from the first node, and updating second link quality metric data based on communication over the link at the second data rate, the second link quality metric data including at least one of:

a second ETX metric indicative of a second ratio of a number of transmission attempts sent by the first node to the second node to a number of acknowledged transmission attempts, at the second data rate, or a second ETT metric indicative of a time to transmit a transmission of a given size multiplied by the second ETX metric at the second data rate; and based at least in part on the first and second updated link quality metric data, setting the first data rate as a new preferred data rate.

14. The one or more non-transitory computer-readable media of claim 13, wherein:

the information message is a first information message, and the operations further comprise:

sending a second information message to the second node over the link at the first data rate.

15. The one or more non-transitory computer-readable media of claim 14, wherein:

the polling message is a first polling message, and the operations further comprise:

sending a second polling message to the second node over the link at a third data rate, the third data rate based at least in part on the first data rate; and receiving an acknowledgement message corresponding to the second polling message, wherein sending the second information message is based at least in part on the receiving the acknowledgement message corresponding to the second polling message.

16. The one or more non-transitory computer-readable media of claim 15, wherein the operations further comprise:

determining the third data rate to be a next slowest available data rate than the first data rate.

17. The one or more non-transitory computer-readable media of claim 13, wherein based at least in part on the first and second updated link quality metric data, setting the first data rate as the new preferred data rate includes:

setting the first data rate as the new preferred data rate in response to determining that link quality using the second data rate has degraded based at least in part on the second updated link quality metric data and the first updated link quality metric data indicates that the first data rate is appropriate to be the new preferred data rate.

* * * * *